United States Patent
Lei

(10) Patent No.: US 12,309,880 B2
(45) Date of Patent: May 20, 2025

(54) DATA PROCESSING METHOD AND APPARATUS, ELECTRONIC DEVICE, TERMINAL DEVICE, AND STORAGE MEDIUM

(71) Applicant: TENCENT TECHNOLOGY (SHENZHEN) COMPANY LIMITED, Guangdong (CN)

(72) Inventor: Yixue Lei, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 356 days.

(21) Appl. No.: 17/483,891

(22) Filed: Sep. 24, 2021

(65) Prior Publication Data
US 2022/0014899 A1  Jan. 13, 2022

Related U.S. Application Data

(63) Continuation of application No. PCT/CN2020/115546, filed on Sep. 16, 2020.

(30) Foreign Application Priority Data

Sep. 27, 2019 (CN) .................. 201910927872.5

(51) Int. Cl.
*H04W 4/60* (2018.01)
*H04W 8/18* (2009.01)
(Continued)

(52) U.S. Cl.
CPC ............ *H04W 8/183* (2013.01); *H04W 4/60* (2018.02); *H04W 68/005* (2013.01); *H04W 88/06* (2013.01)

(58) Field of Classification Search
CPC ..... H04W 8/183; H04W 4/60; H04W 68/005; H04W 88/06
See application file for complete search history.

(56) References Cited

U.S. PATENT DOCUMENTS

2003/0125073 A1  7/2003  Tsai et al.
2015/0245309 A1  8/2015  Nayak et al.
(Continued)

FOREIGN PATENT DOCUMENTS

CN       1859248 A    11/2006
CN     102118682 A     7/2011
(Continued)

OTHER PUBLICATIONS

Japanese Office Action issued Nov. 21, 2022 in Application No. 2021-555824, with English Translation, pp. 1-23.
(Continued)

*Primary Examiner* — Barry W Taylor
(74) *Attorney, Agent, or Firm* — ArentFox Schiff LLP

(57) ABSTRACT

A data processing method performed by an electronic device includes obtaining subscription information of the terminal device in which are disposed at least two subscriber identity module (SIM) cards having corresponding SIM card identifiers. The subscription information is searched for and obtained according to each of the SIM card identifiers. Further, based on the obtained subscription information, a service type of a subscribed service for each of the SIM card identifiers is determined. A priority for the service type of the subscribed service for each of the SIM card identifiers is then determined and a notification message is transmitted to the terminal device. The notification message includes the priority determined for the service type of the subscribed service for each of the SIM card identifiers, and causes the terminal device to process a corresponding communication
(Continued)

service according to the priority determined for each service type for each SIM card identifier.

17 Claims, 4 Drawing Sheets

(51) Int. Cl.
*H04W 68/00* (2009.01)
*H04W 88/06* (2009.01)

(56) References Cited

U.S. PATENT DOCUMENTS

| | | | |
|---|---|---|---|
| 2015/0350877 A1* | 12/2015 | Li | H04W 8/183 |
| | | | 455/558 |
| 2017/0150545 A1 | 5/2017 | Ramkumar et al. | |
| 2017/0353854 A1 | 12/2017 | Johnson et al. | |
| 2017/0359800 A1 | 12/2017 | Cui et al. | |
| 2018/0139602 A1* | 5/2018 | Chastain | H04W 8/205 |
| 2020/0084814 A1 | 3/2020 | Lindoff et al. | |
| 2021/0058774 A1* | 2/2021 | Yang | H04W 12/086 |
| 2021/0092706 A1* | 3/2021 | Ozturk | H04W 76/11 |
| 2022/0030548 A1* | 1/2022 | Chun | H04W 8/183 |
| 2022/0124594 A1* | 4/2022 | Wang | H04W 8/02 |
| 2022/0201648 A1* | 6/2022 | Nord | H04W 8/183 |
| 2022/0225273 A1* | 7/2022 | Geng | H04W 76/28 |
| 2022/0240213 A1* | 7/2022 | Ly | H04W 60/04 |
| 2022/0256500 A1* | 8/2022 | Gurumoorthy | H04W 68/02 |
| 2023/0300787 A1* | 9/2023 | Phan | H04W 68/005 |
| | | | 455/458 |

FOREIGN PATENT DOCUMENTS

| | | |
|---|---|---|
| CN | 103781109 A | 5/2014 |
| CN | 105554884 A | 5/2016 |
| CN | 106385675 A | 2/2017 |
| CN | 107079283 A | 8/2017 |
| CN | 108882222 A | 11/2018 |
| CN | 109246301 A | 1/2019 |
| CN | 110581809 A | 12/2019 |
| JP | 2008125013 A | 5/2008 |
| JP | 2018519680 A | 7/2018 |
| JP | 2018527765 A | 9/2018 |
| JP | 2018201233 A | 12/2018 |
| KR | 20180057655 A | 5/2018 |
| WO | 2018001459 A1 | 1/2018 |
| WO | 2018005419 A1 | 1/2018 |
| WO | 2018157439 A1 | 9/2018 |
| WO | 2018169015 A1 | 9/2018 |
| WO | 2019153252 A1 | 8/2019 |

OTHER PUBLICATIONS

Supplementary European Search Report issued Oct. 24, 2022 in Application No. 20869271.5, pp. 1-10.
Chinese Office Action issued Sep. 20, 2022 in Application No. 201910927872.5, with English Translation, pp. 1-18.
International Search Report issued Nov. 25, 2020, in PCT/CN2020/115546 (with English translation), (6 pages).
Written Opinion issued Nov. 25, 2020, in PCT/CN2020/115546 (4 pages).

* cited by examiner

DATA PROCESSING METHOD AND APPARATUS, ELECTRONIC DEVICE, TERMINAL DEVICE, AND STORAGE MEDIUM

RELATED APPLICATIONS

This application is a continuation of International Application No. PCT/CN2020/115546, entitled "DATA PROCESSING METHOD AND APPARATUS, ELECTRONIC DEVICE, TERMINAL DEVICE, AND STORAGE MEDIUM," and filed on Sep. 16, 2020, which claims priority to Chinese Patent Application No. 201910927872.5, entitled "DATA PROCESSING METHOD, PLURAL SIM CARD SERVICE FUNCTION MANAGEMENT ENTITY AND TERMINAL DEVICE," filed on Sep. 27, 2019. The entire disclosures of the above-identified applications are incorporated herein by reference in their entirety.

FIELD OF THE TECHNOLOGY

This disclosure relates to the field of computer technologies, including a data processing method and apparatus, an electronic device, a terminal device, and a storage medium.

BACKGROUND OF THE DISCLOSURE

With the rapid development of an intelligent communication device, a terminal device becomes an indispensable part of our work and life. In addition to achieving a basic call function and a short message transmission function, the terminal device further operates various appliance programs, to achieve additional functions, such as, photographing, and chatting with other users through a video. Meanwhile, the terminal device receives various messages (a call, a short message, or a message of an appliance program) from the other users, shortening distance between people, and more convenient to obtain abundant information for people.

For a terminal device (such as a mobile phone), a subscriber identity module (SIM) card is necessary, and the terminal device may achieve functions of calling and connecting to a network by using the SIM card. A current terminal device generally supports a plurality of SIM cards of different operators, and the terminal device supporting the plurality of SIM cards can be referred to as a multi-SIM terminal.

A current multi-SIM terminal may include three types: a dual-mode and single-standby, a dual-mode and dual-standby, and a dual-mode and bi-pass. The multi-SIM terminal with the dual-mode and dual-standby is more widely used, and may keep a connection with a network corresponding to a SIM card and monitor a paging message from another network at the same time. In a condition of the dual-mode and dual-standby, a communication behavior of the multi-SIM terminal (for example, whether and when to receive the paging message from the another network and initiate a connection to process service transmission) is entirely controlled by the terminal device, and the network does not control the communication behavior of the multi-SIM terminal. In this case, a service is easily interrupted. For example, when a user of the multi-SIM terminal is, based on a SIM card 1, in a telephone conference based on a social application, a short message service can be on a SIM card 2, and it is quite likely that the short message is a harassing message, but the multi-SIM terminal still needs to receive the message, thereby possibly causing a reduction of call quality of the telephone conference.

SUMMARY

Embodiments of this disclosure provide a data processing method and an apparatus, an electronic device, a terminal device, and a storage medium, for determining a service type of a subscribed service corresponding to each subscriber identity module (SIM) card identifier on the terminal device, and configuring a priority for the service type of the subscribed service corresponding to each SIM card identifier, to indicate the terminal device to process communication services according to the priority configured for the service type of the subscribed service corresponding to each SIM card identifier, which helps to improve the service continuity when the terminal device processes communication services.

According to one aspect, an embodiment of the present disclosure provides a data processing method, performed by an electronic device, including:
  obtaining subscription information of a terminal device, a plurality of SIM card identifiers being disposed in the terminal device, and the subscription information being searched for and obtained according to each of the SIM card identifiers;
  determining, based on the obtained subscription information, a service type of a subscribed service for each of the SIM card identifiers; and
  configuring a priority for the service type of the subscribed service for each of the SIM card identifiers.

According to another aspect, an embodiment of the present disclosure provides another data processing method, performed by a terminal device, including:
  receiving, from a network element of a core network, a paging message for a target SIM card identifier of a plurality of SIM card identifiers disposed in the terminal device;
  determining a particular service type represented by the received paging message;
  determining, according to a priority configured for a service type of a subscribed service corresponding to each SIM card identifier of the SIM card identifiers notified by an electronic device, a particular priority of the particular service type represented by the received paging message; and
  performing service processing according to the determined particular priority.

According to another aspect, an embodiment of the present disclosure provides a data processing apparatus, including:
  circuitry configured to
  obtain subscription information of a terminal device, a plurality of SIM card identifiers being disposed in the terminal device, and the subscription information being searched for and obtained according to each of the SIM card identifiers;
  determine, based on the obtained subscription information, a service type of a subscribed service for each of the SIM card identifiers; and
  configure a priority for the service type of the subscribed service for each of the SIM card identifiers.

According to another aspect, an embodiment of the present disclosure provides another data processing apparatus, including:

circuitry configured to
receive, from a network element of a core network, a paging message for a target SIM card identifier of a plurality of SIM card identifiers disposed in a terminal device; and
determine a particular service type represented by the paging message received by the communication module;
determine, according to a priority configured for a service type of a subscribed service for each of the SIM card identifiers notified by an electronic device, a particular priority of the particular service type represented by the received paging message; and
perform service processing according to the determined particular priority.

According to another aspect, an embodiment of the present disclosure further provides an electronic device, including processing circuitry and a memory, the processing circuitry being connected to the memory, the memory being configured to store a computer program, the computer program including program instructions, and the processing circuitry being configured to invoke the program instructions, to perform the data processing method performed by the foregoing electronic device.

According to another aspect, an embodiment of the present disclosure further provides a terminal device, including processing circuitry and a memory, the processing circuitry being connected to the memory, the memory being configured to store a computer program, the computer program including program instructions, and the processing circuitry being configured to invoke the program instructions, to perform the data processing method performed by the foregoing terminal device.

According to another aspect, an embodiment of the present disclosure further provides a non-transitory computer-readable storage medium, storing a computer program, the computer program including program instructions, the program instructions, when executed by a processor, causing the processor to perform the foregoing data processing method.

According to another aspect, an embodiment of the present disclosure further provides a computer program product or a computer program, the computer program product or the computer program including computer instructions, the computer instructions being stored in a non-transitory computer-readable storage medium. A processor of a computer device reads the computer instructions from the non-transitory computer-readable storage medium, and executes the computer instructions, to cause the computer device to perform the foregoing data processing method.

BRIEF DESCRIPTION OF THE DRAWINGS

To describe the technical solutions of the embodiments of the present disclosure or the related art more clearly, the following briefly introduces the accompanying drawings required for describing the embodiments or the related art. The accompanying drawings in the following description show only some embodiments of this application, and a person of ordinary skill in the art may still derive other accompanying drawings from these accompanying drawings without creative efforts.

DESCRIPTION OF EMBODIMENTS

In an embodiment, an electronic device independent of an operator, such as, a multi-subscriber identity module (SIM) card service function management entity, is introduced to coordinate management of communication services on a terminal device, thereby reducing a probability that a communication service is interrupted, and improving the service continuity that the terminal device processes communication services.

At least two SIM card identifiers are disposed in the terminal device, and the multi-SIM card service function management entity may be a network element in a core network or independent of any core network. By being connected to the core network, the multi-SIM card service function management entity may determine, according to obtained subscription information (for example, service information and tariff information) of the terminal device, a service type of a subscribed service corresponding to each SIM card identifier, and configure a priority for the service type of the subscribed service corresponding to the each SIM card identifier, to solve a problem of service continuity of the terminal device in scenarios that multi-SIM cards belong to the same operator or different operators.

In this embodiment, the multi-SIM card service function management entity manages services of a plurality of SIM cards, and can be applied in a 4G network or a 5G network. This is not limited in this application.

In an embodiment, the foregoing multi-SIM card service function management entity may be connected to a plurality of core networks and is independent of any particular core network, and is used for coordinating communication services of the terminal device in a scenario of different operators. In this case, a core network corresponding to the each SIM card identifier differs. In other words, the plurality of SIM cards disposed in the terminal device are from different operators, for example, two SIM cards are disposed in the terminal device and are respectively a SIM card 1 and a SIM card 2. An operator corresponding to the SIM card 1 is, e.g., China Mobile, therefore, the SIM card 1 correspondingly belongs to a core network of China Mobile. An operator corresponding to the SIM card 2 is, e.g., China Unicom, therefore, the SIM card 2 correspondingly belongs to a core network of China Unicom. The multi-SIM card service function management entity may exchange data with a network element of a core network through a specified interface, and in this case, information exchanged between the multi-SIM card service function management entity and the network element of the core network includes: priority configuration information of service types related to a multi-SIM card application applicable to a user of operators corresponding to the plurality of core networks.

Figure 1:
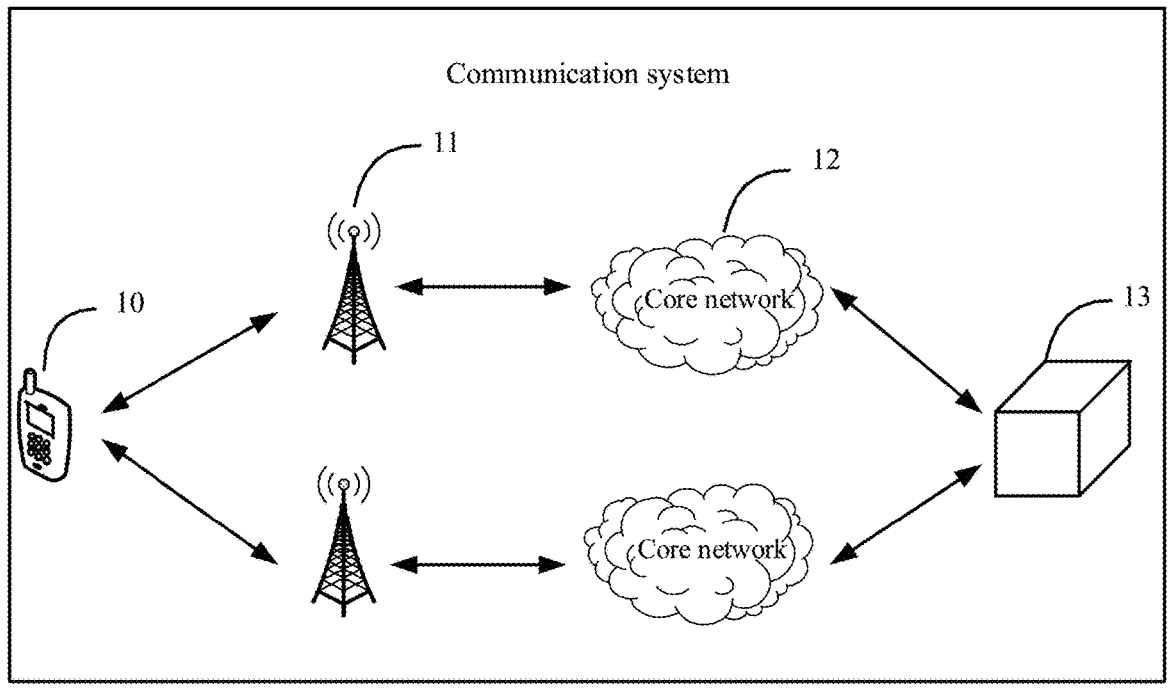
FIG. 1 is a schematic structural diagram of a communication system according to an embodiment.

Exemplarily, referring to a communication system shown in FIG. 1, the communication system includes: a terminal device 10 provided with at least two SIM card identifiers, at least one base station 11, at least one core network 12, and an electronic device 13 (specifically, a multi-SIM card service function management entity). The multi-SIM card service function management entity 13 is independent of any core network 12.

In this case, the multi-SIM card service function management entity 13 may pre-establish a trust relationship with the terminal device 10 and a network element of the core network 12. Further, the multi-SIM card service function management entity 13 may obtain each SIM card identifier of the terminal device 10, obtain subscription information of the terminal device 10 from the core network 12 based on the each SIM card identifier, and determine, based on the subscription information, a service type of a subscribed service corresponding to the each SIM card identifier, to configure a priority for the service type of the subscribed service corresponding to the each SIM card identifier. Further, the multi-SIM card service function management entity 13 may transmit a notification message to the terminal device 10 and the network element of the core network 12.

Further, the network element of the core network 12 may generate, based on an indication of the notification message, a paging message representing the service type for the each SIM card identifier. Exemplarily, when initiating a paging for the SIM card 1, the network element of the core network 12 may determine a service type corresponding to the paging, and further generate, based on the indication of the notification message, a paging message representing the service type for the SIM card 1.

Further, the terminal device 10 may receive a paging message for a target SIM card identifier in the at least two SIM card identifiers disposed in the terminal device, determine a service type represented by the paging message, and determine, according to the priority configured for the service type of the subscribed service corresponding to the each SIM card identifier notified by the electronic device, a priority of the service type represented by the paging message under the target SIM card identifier, and further perform service processing according to the determined priority. The target SIM card identifier is any one of the at least two SIM card identifiers.

In an embodiment, the foregoing multi-SIM card service function management entity may be one network element in the core network, and may be used for coordinating communication services of the terminal device in a scenario of the same operator. In this case, each SIM card identifier corresponds to the same core network. In other words, the plurality of SIM cards disposed in the terminal device are from the same operator. The multi-SIM card service function management entity may exchange data with a network element of a core network through a specified interface, and in this case, content exchanged between the multi-SIM card service function management entity and the network element of the core network is: priority configuration information of service types related to a multi-SIM card application applicable to a user of an operator corresponding to the core network.

Figure 2:
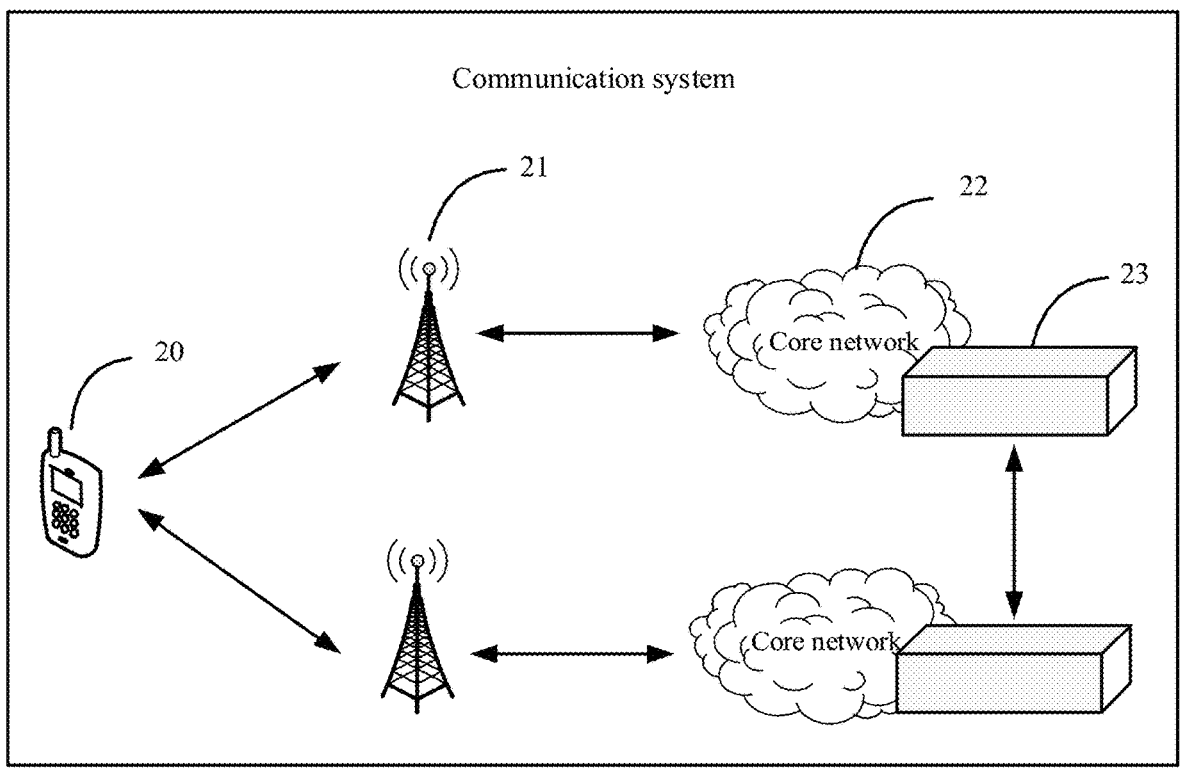
FIG. 2 is a schematic structural diagram of another communication system according to an embodiment.

Exemplarily, referring to another communication system shown in FIG. 2, the communication system includes: a terminal device 20 provided with at least two SIM card identifiers, at least one base station 21, at least one core network 22 and at least one electronic device 23 (specifically, a multi-SIM card service function management entity), where the at least two SIM card identifiers correspond to the same operator, and the multi-SIM card service function management entity 23 may be a network element in the corresponding core network 22. In this case, a function performed by the foregoing terminal device 20, the core network 22, and the multi-SIM card service function management entity 23 may refer to a specific implementation of the terminal device 10, the core network 12, and the multi-SIM card service function management entity 13 in FIG. 1, and details are not described herein again.

In an embodiment, with the constant emergence of service content, a quantity of service types and a quantity of priorities notified by the multi-SIM card service function management entity to the network element of the core network and the terminal device are limited. For example, the multi-SIM card service function management entity notifies a service type of a specified type, and a priority corresponding to the service type of the specified type to the network element of the core network and the terminal device.

In this case, an operator and a third-party service provider may coordinate with each other to map the limited service type and priority to a specific service. For example, the limited service type includes an IP multimedia subsystem (IMS) or a non-IMS voice service provided by the operator, and a priority corresponding to the IMS or non-IMS voice service is 0. In this case, the third-party service provider may coordinate with the operator, to make a service type of any service (such as a service A) thereof belong to the service type of the IMS or non-IMS voice service provided by the operator. If an agreement is reached, the service type of any service (such as the service A) provided by the third-party service provider may be determined as the IMS or non-IMS voice service provided by the foregoing operator, and a corresponding priority is 0.

Figure 3:
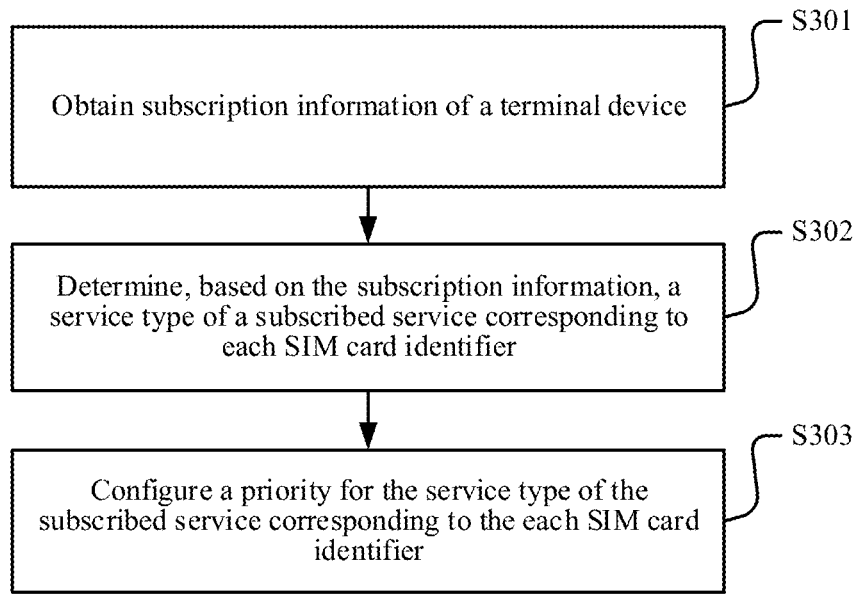
FIG. 3 is a schematic flowchart of a data processing method according to an embodiment.

FIG. 3 is a schematic flowchart of a data processing method according to an embodiment. The method of this embodiment may be performed by an electronic device, such as the multi-SIM card service function management entity 13 in FIG. 1 or the multi-SIM card service function management entity 23. The method of this embodiment of this application includes the following steps.

In step S301, subscription information of a terminal device is obtained, at least two SIM card identifiers being disposed in the terminal device. The subscription information is searched for and obtained according to each of the SIM card identifiers.

In an embodiment, after the trust relationship is established between the multi-SIM card service function management entity and the terminal device and the network element of the core network, an SIM card identifier of each SIM card disposed in the terminal device may be obtained, the SIM card identifier including: an international mobile subscriber identity (IMSI) or a subscriber permanent identifier (SUPI).

Further, the multi-SIM card service function management entity may search and obtain the subscription information of the terminal device based on the SIM card identifier. The subscription information may include service information, tariff information, and the like corresponding to the each SIM card identifier disposed in the terminal device.

In step S302, based on the subscription information, a service type of a subscribed service corresponding to the each SIM card identifier is determined.

In step S303, a priority for the service type of the subscribed service corresponding to the each SIM card identifier is configured.

In an embodiment, the foregoing subscription information may include the service information corresponding to the each SIM card identifier disposed in the terminal device, the service information represents the subscribed service corresponding to the each SIM card identifier, and the multi-SIM card service function management entity may determine, based on the service information, the service type of the subscribed service corresponding to the each SIM card identifier, and further configure a priority for the service type of the subscribed service corresponding to each SIM card identifier.

For example, two SIM cards are disposed in the terminal device, and SIM card identifiers corresponding to the two SIM cards are respectively a SIM card A and a SIM card B. The service information in the subscription information represents that a subscribed service corresponding to the SIM card A is an IMS voice service, and a subscribed service corresponding to the SIM card B is a non-IMS short message service. Therefore, the multi-SIM card service function management entity may determine, based on the service information, that a service type of the subscribed service corresponding to the SIM card A is the IMS voice service, and a service type of the subscribed service corresponding to the SIM card B is the non-IMS short message service.

Exemplarily, it is assumed that two SIM cards are disposed in the terminal device, SIM card identifiers corresponding to the two SIM cards are respectively a SIM card A and a SIM card B, a service type of a subscribed service corresponding to the SIM card A includes: an IMS voice service or a non-IMS voice service, and an IMS short message service or a non-IMS short message service, and a service type of a subscribed service corresponding to the SIM card B is a video call of a social appliance W and a voice call of the social appliance W. For this case, the service type of the subscribed service corresponding to each SIM card identifier may be configured with a priority shown in table 1.

TABLE 1

| Service type | SIM card identifier | Priority |
| --- | --- | --- |
| IMS or non-IMS voice service | SIM card A | 0 |
| IMS or non-IMS short message service | SIM card A | 2 |
| WeChat video call | SIM card B | 1 |
| WeChat voice call | SIM card B | 1 |

In an embodiment, after configuring the priority for the service type of the subscribed service corresponding to the each SIM card identifier, the multi-SIM card service function management entity may transmit a notification message to the terminal device, the notification message carrying the priority configured for the service type of the subscribed service corresponding to the each SIM card identifier, to cause the terminal device to process a corresponding communication service according to the priority configured for each service type.

In an embodiment, after configuring the priority for the service type of the subscribed service corresponding to the each SIM card identifier, the multi-SIM card service function management entity may further transmit a notification message to a network element of a core network corresponding to the each SIM card identifier of the terminal device, and the notification message is used for indicating that a paging message generated by each of the network elements of the core network for the corresponding SIM card identifier is the paging message representing the corresponding service type. As a result, when initiating a paging for a corresponding SIM card, each of the network elements of the core network determines a service type corresponding to the paging and generates a paging message representing the service type according to the received notification message.

Exemplarily, a SIM card identifier disposed in the terminal device is a SIM card A, and when initiating a paging for the SIM card A, a network element of a core network corresponding to the SIM card identifier may determine a service type corresponding to the paging, and generate, based on an indication of the foregoing notification message, a paging message representing the service type for the SIM card A.

In an embodiment, a core network corresponding to each SIM card identifier differs. In other words, the plurality of SIM cards disposed in the terminal device are from different operators. In this case, reference may be made to the multi-SIM card service function management entity 13 shown in FIG. 1, the multi-SIM card service function management entity may be connected to a plurality of core networks and be independent of any core network, and is used for coordinating communication services of the terminal device in the scenario of different operators.

In an embodiment, each SIM card identifier corresponds to the same core network. In other words, the plurality of SIM cards disposed in the terminal device are from the same operator. In this case, reference may be made to the multi-SIM card service function management entity 23 shown in FIG. 2, the multi-SIM card service function management entity may be a network element in the same core network, and is used for coordinating communication services of the terminal device in the scenario of the same operator.

In an embodiment, before obtaining the subscription information of the terminal device, the multi-SIM card service function management entity may further obtain identity information of each SIM card disposed in the terminal device, and the identity information includes: a target number part in an IMSI and target field content in a SUPI, or the identity information includes: information about a subscription concealed identifier (SUCI) and a temporary user equipment (UE) identity obtained by mapping a SUPI, such as information about a globally unique temporary UE identity 5G-S-TMSI in 5G.

The target number part in the IMSI and the target field content in the SUPI may be preset, for example, the last 4 numbers in the IMSI may be preset as the target number part, and in another example, the first 3 fields in the SUPI may be preset as the target field content, or a preset field in the SUPI may be determined as the target field content, which is not specifically limited in this application.

In an embodiment, the multi-SIM card service function management entity may further calculate, based on the identity information of the each SIM card, a paging occasion of the terminal device in the core network corresponding to the each SIM card identifier, and output, if detecting that a conflict exists between the paging occasions of the terminal device in the core networks corresponding to the SIM card identifiers, prompt information to the terminal device, to cause the terminal device to modify the identity information of each SIM card.

Alternatively, in another embodiment, if detecting that no conflict exists between the paging occasions of the terminal device in the core networks corresponding to the SIM card identifiers, the terminal device is not notified to perform any processing.

The paging occasion is a sub-frame number corresponding to a position of a paging frame. Exemplarily, two SIM cards are disposed in the terminal device, and SIM card identifiers corresponding to the two SIM cards are respectively a SIM card A and a SIM card B, the SIM card A corresponding to a core network 1, and the SIM card B corresponding to a core network 2. In this case, the multi-SIM card service function management entity calculates, based on identity information of the SIM card A, that a paging occasion of the terminal device in the core network 1 is a sub-frame 4, and calculates, based on identity information of the SIM card B, that a paging occasion of the terminal device in the core network 2 is a sub-frame 0. Because the sub-frame 4 and the sub-frame 0 are different, it may be determined that no conflict exists between the paging occasions of the terminal device in the core network 1 and the core network 2.

Alternatively, if the multi-SIM card service function management entity calculates, based on the identity information of the SIM card A, that the paging occasion of the terminal device in the core network 1 is the sub-frame 4, and calculates, based on the identity information of the SIM card B, that the paging occasion of the terminal device in the core network 2 is also the sub-frame 4, it may be determined that a conflict exists between the paging occasions of the terminal device in the core network 1 and the core network 2, so that prompt information is outputted to the terminal device and used for prompting that a conflict exists between the paging occasions of the terminal device in the core network 1 and the core network 2.

In this embodiment, the multi-SIM card service function management entity may obtain the subscription information of the terminal device provided with the at least two SIM card identifiers, and determine, based on the subscription information, the service type of the subscribed service corresponding to the each SIM card identifier, to configure the priority for the service type of the subscribed service corresponding to the each SIM card identifier, so as to further indicate that the paging message generated by the network element of the core network for the each SIM card identifier is the paging message representing the service type, and indicate the terminal device to process communication services according to the priority configured for the service type of the subscribed service corresponding to the each SIM card identifier, which helps to ensure a communication quality of a communication service with a higher priority, and improve the service continuity that the terminal device processes communication services.

Figure 4:
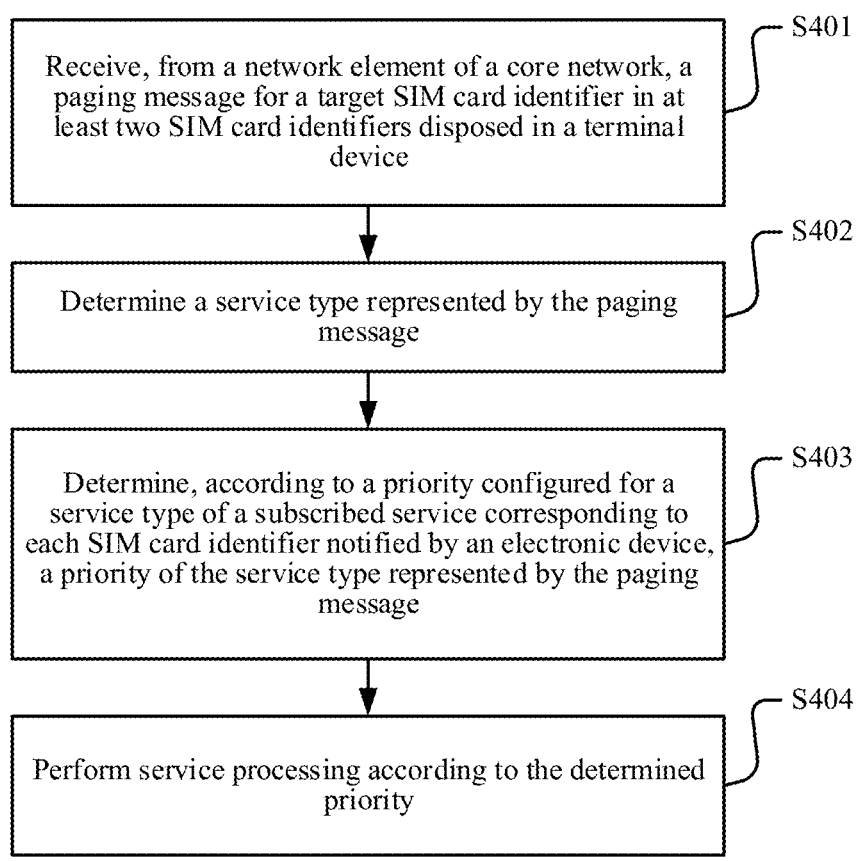
FIG. 4 is a schematic flowchart of another data processing method according to an embodiment.

FIG. 4 is a schematic flowchart of another data processing method according to an embodiment, and the method of this embodiment may be performed by a terminal device, such as the terminal device 10 in FIG. 1 or the terminal device 20 in FIG. 2. The method of this embodiment includes the following steps.

In step S401, a paging message for a target SIM card identifier of at least two SIM card identifiers disposed in the terminal device is received from a network element of a core network. The target SIM card identifier is any one of the at least two SIM card identifiers.

In step S402, a service type represented by the paging message is determined.

In an embodiment, the terminal device may determine the service type according to a parameter value disposed in the paging message, where the network element of the core network determines, according to a notification message received from an electronic device, the service type corresponding to this paging message, and generates a parameter value representing the service type. Different parameter values are defined to correspond to different service types in the paging message.

Specifically, the network element of the core network may receive a notification message transmitted by a multi-SIM card service function management entity, and the notification message is used for indicating that a paging message generated by the network element of the core network for a corresponding SIM card identifier is a paging message representing a corresponding service type. Further, in an embodiment, before delivering the paging message for the target SIM card identifier to the terminal device, the network element of the core network may fill in parameter values representing service types in the paging message. In other words, the core network may generate different parameter values for different service types. Further, the core network may deliver the paging message in which the parameter value representing the service type is filled, and after receiving the paging message for the target SIM card identifier, the terminal device may determine, based on the parameter value representing the service type filled in the paging message, the service type represented by the paging message.

In another embodiment, the terminal device may determine the service type according to a message body of the paging message, where the network element of the core network determines, according to a notification message received from the electronic device, the service type corresponding to this paging message, and generates the paging message by using a message body matching the service type.

Specifically, before delivering the paging message for the target SIM card identifier to the terminal device, the network element of the core network may use the message body matching the service type to generate the paging message for the target SIM card identifier. In other words, paging messages with different message bodies represent different service types. Further, after the network element of the core network delivers the paging message to the terminal device, the terminal device may identify the message body of the paging message, to determine the service type represented by the paging message.

In step S403, according to a priority configured for a service type of a subscribed service corresponding to each SIM card identifier notified by an electronic device, a priority of the service type represented by the paging message under the target SIM card identifier is determined.

Exemplarily, it is assumed that two SIM cards are disposed in the terminal device, SIM card identifiers corresponding to the two SIM cards are respectively a SIM card A and a SIM card B, a service type of a subscribed service corresponding to the SIM card A includes: an IMS or a non-IMS voice service, and an IMS or a non-IMS short message service, a service type of a subscribed service corresponding to the SIM card B is a video call of a social appliance W and a voice call of the social appliance W, and the priority configured for the service type of the subscribed service corresponding to the each SIM card identifier notified by the electronic device (that is, the foregoing multi-SIM card service function management entity) is shown in Table 1. In this case, if the target SIM card identifier is the SIM card A, and the service type represented by the paging message is the non-IMS voice service, it may be determined that the priority of the service type "the non-IMS voice service" represented by the paging message under the SIM card A is 0 base on Table 1.

In step S404, service processing according to the determined priority is performed.

In an embodiment, if the determined priority is higher than a priority of a current communication service, the paging message is responded to, and the current communication service is interrupted. In another embodiment, if the determined priority is lower than the priority of the current communication service, the paging message is not responded to.

In an embodiment, the priority of the current communication service is determined according to the priority configured for the service type of the subscribed service corresponding to the each SIM card identifier notified by the electronic device (that is, the foregoing multi-SIM card service function management entity). In an embodiment, the terminal device may determine a SIM card identifier to which the current communication service belongs and a service type of the current communication service, and further determine, according to the priority configured for the service type of the subscribed service corresponding to the each SIM card identifier notified by the electronic device, a priority corresponding to the service type of the current communication service, namely, the priority of the current communication service, under the SIM card identifier to which the current communication service belongs.

Exemplarily, it is assumed that two SIM cards are disposed in the terminal device, and SIM card identifiers corresponding to the two SIM cards are respectively a SIM card A and a SIM card B, a service type of a subscribed service corresponding to the SIM card A includes: an IMS or a non-IMS voice service, and an IMS or a non-IMS short message service; a service type of a subscribed service corresponding to the SIM card B is a video call of a social appliance W and a voice call of the social appliance W; and the priority configured for the service type of the subscribed service corresponding to the each SIM card identifier notified by the foregoing multi-SIM card service function management entity is shown in Table 1, where a priority 0 is higher than a priority 1, and the priority 1 is higher than a priority 2.

If the terminal device is performing a WeChat voice call through the SIM card B (in other words, the service type of the current communication service is the WeChat voice call), a paging message is suddenly received in the SIM card A, and the paging message is related to the non-IMS voice service (in other words, the service type represented by the paging message is the non-IMS voice service). In this case, if the terminal device determines, based on table 1, that the priority of the current communication service is 1, the priority corresponding to the service type represented by the paging message under the SIM card A is 0, and the priority 0 is higher than the priority 1, the paging message may be responded to, and the current communication service is interrupted, to perform the non-IMS voice service.

Alternatively, if the terminal device is performing a WeChat voice call through the SIM card B (in other words, the service type of the current communication service is the WeChat voice call), a paging message related to the non-IMS short message service (in other words, the service type represented by the paging message is the non-IMS short message service) is suddenly received in the SIM card A. In this case, if the terminal device determines, based on Table 1, that the priority of the current communication service is 1, the priority corresponding to the service type represented by the paging message under the SIM card A is 2, and the priority 2 is lower than the priority 1, the paging message may not be responded to, and the current communication service is continued.

In this embodiment, the terminal device receives the paging message for the target SIM card identifier of the at least two SIM card identifiers disposed in the terminal device, determines the service type represented by the paging message, determines, according to the priority configured for the service type of the subscribed service corresponding to the each SIM card identifier notified by the electronic device, the priority of the service type represented by the paging message under the target SIM card identifier, and further performs service processing according to the determined priority. In this way, communication services may be managed based on priorities, thereby reducing a probability that a communication service is interrupted, and improving the service continuity that the terminal device processes communication services.

Another embodiment further provides a computer storage medium, storing program instructions, the program instructions, when executed, being used for performing the corresponding method described in the foregoing embodiments.

Figure 5:
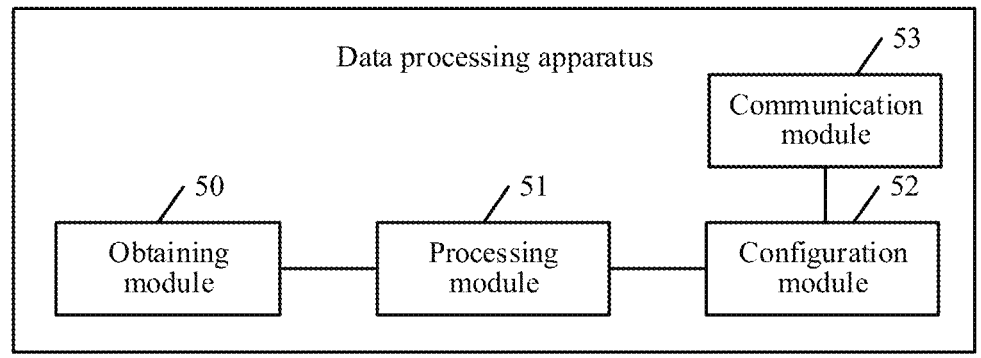
FIG. 5 is a schematic structural diagram of a data processing apparatus according to an embodiment.

FIG. 5 is a schematic structural diagram of a data processing apparatus according to an embodiment. The data processing apparatus of this embodiment may be disposed in an electronic device, such as the multi-SIM card service function management entity 13 in FIG. 1 and the multi-SIM card service function management entity 23 in FIG. 2.

In an implementation of the apparatus of this embodiment, the apparatus includes an obtaining module 50, a processing module 51, and a configuration module 52. One or more modules of the apparatus can be implemented by processing circuitry, software, or a combination thereof, for example.

The obtaining module 50 is configured to obtain subscription information of a terminal device, at least two SIM card identifiers being disposed in the terminal device, and the subscription information being searched and obtained according to each SIM card identifier.

The processing module 51 is configured to determine, based on the subscription information, a service type of a subscribed service corresponding to the each SIM card identifier.

The configuration module 52 is configured to configure a priority for the service type of the subscribed service corresponding to the each SIM card identifier.

In an embodiment, the apparatus further includes a communication module 53 configured to transmit a notification message to the terminal device, the notification message carrying the priority configured for the service type of the subscribed service corresponding to the each SIM card identifier, to cause the terminal device to process a corresponding communication service according to the priority configured for each service type.

In an embodiment, the communication module 53 is further configured to transmit a notification message to a network element of a core network corresponding to the each SIM card identifier of the terminal device. As a result, when initiating a paging for a corresponding SIM card, each of the network element of the core network determines a service type corresponding to the paging, and generates a paging message representing the service type according to the notification message.

In an embodiment, a core network corresponding to the each SIM card identifier differs, and the electronic device is independent of any particular core network.

In an embodiment, the each SIM card identifier corresponds to the same core-network, and the electronic device is a network element in the same core network.

In an embodiment, the obtaining module 50 is further configured to obtain an SIM card identifier of each SIM card disposed in the terminal device; and the SIM card identifier includes: an IMSI or an SUPI.

In an embodiment, the obtaining module 50 is further configured to obtain identity information of the each SIM card disposed in the terminal device; and the identity information includes: a target number part in an IMSI and target field content in a SUPI.

In an embodiment, the obtaining module 50 is further configured to obtain the identity information of the each SIM card disposed in the terminal device; and the identity information includes: information about a subscription concealed identifier (SUCI) and a temporary user equipment (UE) identity obtained by mapping a SUPI.

In an embodiment, the processing module 51 is further configured to calculate, based on the identity information of the each SIM card, a paging occasion of the terminal device in the core network corresponding to the each SIM card identifier; and output, if detecting that a conflict exists between the paging occasions of the terminal device in the core networks corresponding to the SIM card identifiers, prompt information to the terminal device by using the communication module 53, to cause the terminal device to modify the identity information of the each SIM card.

In this embodiment of this application, specific implementations of the foregoing modules may refer to the description of related content in the embodiments corresponding to the foregoing accompanying drawing 3.

Figure 6:
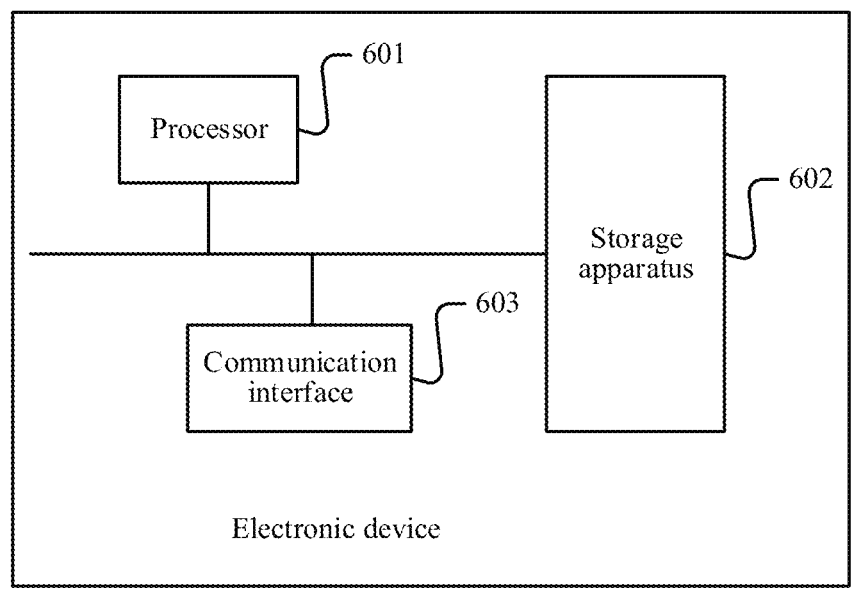
FIG. 6 is a schematic structural diagram of an electronic device according to an embodiment.

FIG. 6 is a schematic structural diagram of an electronic device according to an embodiment of this application, such as the electronic device 13 in FIG. 1 or the electronic device 23 in FIG. 2. The electronic device of this embodiment of this application includes a power supply module and other structures, and includes a processor 601, a storage apparatus 602, and a communication interface 603. The processor 601, the storage apparatus 602, and the communication interface 603 may exchange data, and the processor 601 implements a corresponding data processing function so as to implement the functions of the modules 50-53 shown in FIG. 5.

The storage apparatus 602 may include a volatile memory, for example, a random access memory (RAM). The storage apparatus 602 may alternatively include a non-volatile memory, for example, a flash memory, or a solid-state drive (SSD). The storage apparatus 602 may alternatively include a combination of the foregoing types of memories.

The processor 601 may be a central processing unit (CPU) 601 or other processing circuitry. In an embodiment, the processor 601 may alternatively be a graphics processing unit (GPU) 601. The processor 601 may alternatively be a combination of a CPU and a GPU. In the multi-SIM card service function management entity, a plurality of CPUs and GPUs may be included to perform corresponding data processing as required. In an embodiment, the storage apparatus 602 is configured to store program instructions. The processor 601 may invoke the program instructions, to perform the foregoing data processing methods performed by the electronic device in the embodiments of this application.

In a first possible implementation, the processor 601 invokes the program instructions stored in the storage apparatus 602, to obtain subscription information of a terminal device, at least two SIM card identifiers being disposed in the terminal device, and the subscription information being searched and obtained according to each SIM card identifier; determine, based on the subscription information, a service type of a subscribed service corresponding to the each SIM card identifier; and configure a priority for the service type of the subscribed service corresponding to the each SIM card identifier.

In this embodiment, a specific implementation of the processor 601 may refer to the description of related content in the foregoing embodiments corresponding to the foregoing accompanying FIG. 3.

Figure 7:
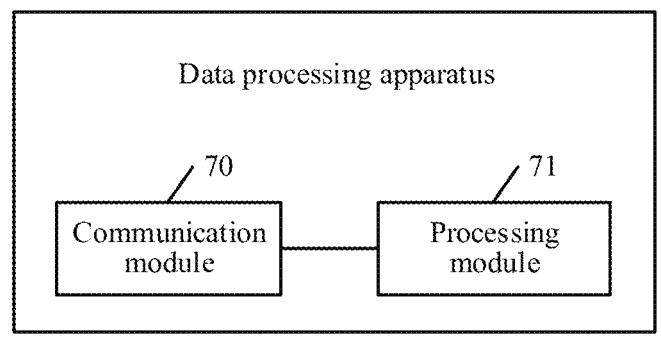
FIG. 7 is a schematic structural diagram of another data processing apparatus according to an embodiment.

FIG. 7 is a schematic structural diagram of another data processing apparatus according to an embodiment of this application, and the data processing apparatus of this embodiment of this application may be disposed in a terminal device, such as the terminal device 10 in FIG. 1 or the terminal device 20 in FIG. 2.

In an implementation of the apparatus of this embodiment, the apparatus includes a communication module 70 and a processing module 71. One or more modules of the apparatus can be implemented by processing circuitry, software, or a combination thereof, for example.

The communication module 70 is, configured to receive, from a network element of a core network, a paging message for a target SIM card identifier in at least two SIM card identifiers disposed in the terminal device.

The processing module 71 is configured to determine a particular service type represented by the paging message, and determine, according to a priority configured for a service type of a subscribed service corresponding to each SIM card identifier notified by an electronic device, a particular priority of the service type represented by the paging message.

The processing module 71 is further configured to perform service processing according to the determined particular priority.

In an embodiment, the processing module 71 is specifically configured to determine the service type according to a parameter value disposed in the paging message, where the network element of the core network determines, according to a notification message received from the electronic device, the service type corresponding to this paging message, and generates a parameter value representing the service type.

In an embodiment, the processing module 71 is specifically configured to determine the service type according to a message body of the paging message, where the network element of the core network determines, according to a notification message received from the electronic device, the service type corresponding to this paging message, and generates the paging message by using a message body matching the service type.

In an embodiment, the processing module 71 is specifically configured to respond to the paging message if the determined priority is higher than a priority of a current communication service, and interrupt the current communication service.

In an embodiment, the processing module 71 is specifically configured to skip responding to the paging message if the determined priority is lower than the priority of the current communication service.

In an embodiment, the processing module 71 is further configured to determine a SIM card identifier to which the current communication service belongs and a service type of the current communication service; and determine, according to the priority configured for the service type of the subscribed service corresponding to the each SIM card identifier notified by the electronic device, the priority of the current communication service under the SIM card identifier to which the current communication service belongs.

In this embodiment, specific implementations of the foregoing modules may refer to the description of related content in the embodiments corresponding to the foregoing accompanying drawing 4.

Figure 8:
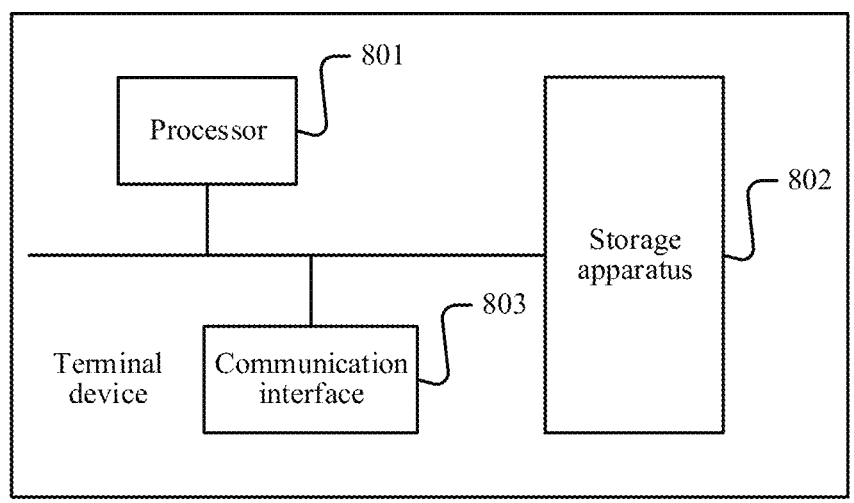
FIG. 8 is a schematic structural diagram of a terminal device according to an embodiment.

FIG. 8 is a schematic structural diagram of a terminal device according to an embodiment of this application, such as the terminal device 10 in FIG. 1 or the terminal device 20 in FIG. 2. The terminal device of this embodiment of this application includes a power supply module and other structures, and includes a processor 801, a storage apparatus 802, and a communication interface 803. The processor 801, the storage apparatus 802, and the communication interface 803 may exchange data, and the processor 801 implements a corresponding data processing function so as to implement the functions of the modules 70 and 71 shown in FIG. 5.

The storage apparatus 802 may include a volatile memory, for example, a random access memory (RAM). The storage apparatus 802 may alternatively include a non-volatile memory, for example, a flash memory or a solid-state drive (SSD). The storage apparatus 802 may alternatively include a combination of the foregoing types of memories.

The processor 801 may be a central processing unit (CPU) 801 or other processing circuitry. In an embodiment, the processor 801 may alternatively be a graphics processing unit (GPU) 801. The processor 801 may alternatively be a combination of a CPU and a GPU. In the terminal device, a plurality of CPUs and GPUs may be included to perform corresponding data processing as required. In an embodiment, the storage apparatus 802 is configured to store program instructions. The processor 801 may invoke the program instructions to perform the foregoing data processing methods related to the terminal device described in the embodiments of this application.

In a first possible implementation, the processor 801 of the terminal device invokes the program instructions stored in the storage apparatus 802, to receive a paging message for a target SIM card identifier in at least two SIM card identifiers disposed in the terminal device from a network element of a core network through the communication interface 803; determine a service type represented by the paging message; determine, according to a priority configured for a service type of a subscribed service corresponding to each SIM card identifier notified by an electronic device, a priority of the service type represented by the paging message; and perform service processing according to the determined priority.

In this embodiment, a specific implementation of the processor 801 may refer to the description of related content in the foregoing embodiments corresponding to the foregoing accompanying FIG. 4.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

A person skilled in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may include a magnetic disc, an optical disc, a read-only memory (ROM), a random access memory (RAM), or the like.

The foregoing descriptions are merely some embodiments of this disclosure, and are not intended to limit the scope of this application. A person of ordinary skill in the art may understand and implement all or some procedures of the foregoing embodiments, and equivalent modifications made according to the claims of this application shall still fall within the scope of this application.

The invention claimed is:

1. A data processing method, performed by an electronic device, comprising:
    obtaining subscription information of a terminal device, a plurality of SIM cards being disposed in the terminal device, and the subscription information being searched for and obtained according to SIM card identifiers of the plurality of SIM cards, the SIM card identifiers of the plurality of SIM cards being obtained from the terminal device;
    determining, based on the obtained subscription information, a service type of a subscribed service for each of the SIM card identifiers;
    configuring a priority for the service type of the subscribed service for each of the SIM card identifiers;
    determining sub-frame numbers corresponding to positions in a paging frame assigned to the terminal device based on identity information of the plurality of SIM cards;
    detecting a conflict between sub-frames when a same sub-frame number is associated with at least two of the plurality of SIM cards; and
    in response to detection of the conflict between the sub-frames corresponding to the positions in the paging frame assigned to the terminal device in core networks corresponding to the plurality of SIM cards, outputting prompt information to the terminal device to cause the terminal device to modify the identity information of each SIM card.

2. The method according to claim 1, further comprising:
    transmitting a notification message to the terminal device, the notification message including the priority configured for the service type of the subscribed service for each of the SIM card identifiers, to cause the terminal device to process a corresponding communication service according to the priority configured for each service type for each of the SIM card identifiers.

3. The method according to claim 1, further comprising:
    transmitting a notification message to a network element of a core network corresponding to a particular SIM card identifier of the SIM card identifiers disposed in the terminal device, to cause the network element of the core network to, when a paging for a SIM card corresponding to the particular SIM card identifier is initiated, determine a service type corresponding to the paging, and generate a paging message representing the determined service type according to the notification message.

4. The method according to claim 1, further comprising, before the obtaining the subscription information of the terminal device, obtaining from the terminal device the SIM card identifiers corresponding to each SIM card disposed in the terminal device, each SIM card identifier comprising an international mobile subscriber identity (IMSI) or a subscriber permanent identifier (SUPI).

5. The method according to claim 1, further comprising, before the obtaining the subscription information of the terminal device, obtaining the identity information of each SIM card disposed in the terminal device, the identity information comprising a target number part in an international mobile subscriber identity (IMSI) and target field content in a subscriber permanent identifier (SUPI).

6. The method according to claim 5, further comprising:
calculating, based on the identity information of each SIM card, the sub-frames assigned to the terminal device in the core networks corresponding to the SIM card identifiers.

7. The method according to claim 1, further comprising, before the obtaining the subscription information of the terminal device, obtaining the identity information of each SIM card disposed in the terminal device, the identity information comprising information about a subscription concealed identifier (SUCI) and a temporary user equipment (UE) identity obtained by mapping a subscriber permanent identifiers (SUPI).

8. The method according to claim 1, further comprising:
obtaining the SIM card identifiers of the plurality of SIM cards disposed in the terminal device from the terminal device; and
outputting priority configuration information to the terminal device based on the configured priority for the service type of the subscribed service for each of the SIM card identifiers, the terminal device being configured to process communication services according to the priority configuration information received from the electronic device, wherein
each of the SIM card identifiers is associated with a plurality of service types, and
the priority configuration information includes priority information for each of the plurality of services types associated with the plurality of SIM card identifiers.

9. A data processing method, performed by a terminal device, comprising:
receiving, from multi-SIM card service function management network element, prompt information indicating that a conflict exists between sub-frames corresponding to positions in a paging frame assigned to the terminal device in core networks corresponding to a plurality of SIM cards disposed in the terminal device, the conflict between the sub-frames being detected when a same sub-frame number is associated with at least two of the plurality of SIM cards, sub-frame numbers of the plurality of SIM cards indicating the positions in the paging frame assigned to the terminal device and being determined based on identity information of the plurality of SIM cards;
after receiving the prompt information, modifying the identity information of at least one of the plurality of SIM cards to resolve the conflict;
receiving, from the multi-SIM card service function management network element, priority information indicating a priority corresponding to a respective service type of each of the plurality of SIM cards;
receiving, from a network element of a core network, a paging message for a target SIM card of the plurality of SIM cards;
determining a service type represented by the received paging message, the service type being indicated by one of a parameter value or a particular message body included in the received paging message;
determining a priority corresponding to the determined service type of the received paging message based on the priority information received from the multi-SIM card service function management network element; and
performing service processing according to the determined priority.

10. The method according to claim 9, wherein the determining the service type comprises:
determining the service type according to the parameter value disposed in the paging message, wherein the network element of the core network determines, according to a notification message received from the multi-SIM card service function management network element, the service type corresponding to the paging message, and generates the parameter value representing the service type.

11. The method according to claim 9, wherein the determining the service type comprises:
determining the service type according to a message body of the paging message, wherein the network element of the core network determines, according to a notification message received from the multi-SIM card service function management network element, the service type corresponding to the paging message, and generates the paging message by using the message body matching the service type.

12. The method according to claim 9, wherein the performing the service processing comprises:
responding to the paging message when the determined priority is higher than a priority of a current communication service, and interrupting the current communication service.

13. The method according to claim 12, wherein the method further comprises:
determining a particular SIM card, of the plurality of SIM cards, to which the current communication service belongs, and a service type of the current communication service; and
determining, according to the priority information received from the multi-SIM card service function management network element, the priority of the current communication service under the particular SIM card to which the current communication service belongs.

14. The method according to claim 9, wherein the performing the service processing comprises:
not responding to the paging message when the determined priority is lower than a priority of a current communication service.

15. A data processing apparatus, comprising:
circuitry configured to
obtain subscription information of a terminal device, a plurality of SIM cards being disposed in the terminal device, and the subscription information being searched for and obtained according to SIM card identifiers of the plurality of SIM cards, the SIM card identifiers of the plurality of SIM cards being obtained from the terminal device;
determine, based on the obtained subscription information, a service type of a subscribed service for each of the SIM card identifiers;
configure a priority for the service type of the subscribed service for each of the SIM card identifiers;
determine sub-frame numbers corresponding to positions in a paging frame assigned to the terminal device based on identity information of the plurality of SIM cards;

detect a conflict between sub-frames when a same sub-frame number is associated with at least two of the plurality of SIM cards; and in response of detection of the conflict between the sub-frames corresponding to the positions in the paging frame assigned to the terminal device in core networks corresponding to the plurality of SIM cards, output prompt information to the terminal device to cause the terminal device to modify the identity information of each SIM card.

16. The apparatus according to claim 15, wherein the circuitry is further configured to:

transmit a notification message to the terminal device, the notification message including the priority configured for the service type of the subscribed service for each of the SIM card identifiers, to cause the terminal device to process a corresponding communication service according to the priority configured for each service type for each of the SIM card identifiers.

17. The apparatus according to claim 15, wherein the circuitry is further configured to:

transmit a notification message to a network element of a core network corresponding to a particular SIM card identifier of the SIM card identifiers disposed in the terminal device, to cause the network element of the core network to, when a paging for a SIM card corresponding to the particular SIM card identifier is initiated, determine a service type corresponding to the paging, and generate a paging message representing the determined service type according to the notification message.

* * * * *